Oct. 8, 1968  D. A. SAYLES  3,404,454

METHOD OF MAKING A FLAT FLEXIBLE CABLE TERMINATION

Filed Oct. 14, 1965  4 Sheets-Sheet 1

WITNESSES
Edwin E. Bassler
Robert C. Baird

INVENTOR
Donald A. Sayles
BY
Charles F. Renz
ATTORNEY 3,404,454
METHOD OF MAKING A FLAT FLEXIBLE CABLE TERMINATION
Donald A. Sayles, Pittsburgh, Pa., assignor, by mesne assignments, to Rogers Corporation, a corporation of Massachusetts
Filed Oct. 14, 1965, Ser. No. 496,048
5 Claims. (Cl. 29—629)

ABSTRACT OF THE DISCLOSURE

The method of manufacturing an electrical circuit assembly wherein a portion of a flat flexible printed circuit cable having a plurality of coplanar electrically conductive members embedded in an electrically insulating material is inserted into a mold cavity by means of a rigid plunger and a guide therefor and the plunger is removed. A thermosetting material is placed within the mold cavity and pressure is applied to the material by means of the plunger to press one surface of the cable to conform the cable to a portion of the surface of the mold cavity. The material is subsequently cured in the mold to form a rigid contact to the cable.

---

This invention relates to electrical circuit assemblies for the termination and connection of flexible multi-conductor cables and more particularly to a method of manufacturing these assemblies.

Flexible electrically conductive circuit assemblies may be provided in the form of electrically conductive circuits or cables with a covering of insulating material. The cable normally is in the form of a plurality of thin separated parallel electrical conductors mounted in suitable plastic insulation. This type of cable has become known in the art as flat flexible cables. One of the problems associated with the use of flexible circuits is the provision of a simple, economical and reliable electrical connection or termination device for the cable. In a copending application Ser. No. 352,156 filed Mar. 16, 1964, now Patent No. 3,278,887 entitled "Electrical Circuit Assembly and Method of Manufacture" by L. R. Travis and assigned to the present assignee, there is described a method and a structure for termination of flexible circuits. In this copending application as well as several other schemes of terminating flat cables, the flat cable is folded back over a mandrel or spacer member and secured thereto by an adhesive. The thickness of the spacer member determines the thickness of the male plug termination. The female plug into which the male plug is inserted requires the male plug to be of rather close tolerances in order to provide good electrical contact and continuity of service.

It is accordingly an object of this invention to provide an improved method of cable termination.

It is another object to provide an improved method of manufacturing a termination or connecting device for flat flexible cable.

It is another object to provide an improved method of connecting device for flat flexible cable.

It is another object to provide an improved termination device for flat flexible cable.

Briefly, the present invention accomplishes the above-cited objects by providing a connection or termination for a flexible flat conductor by providing a molded mandrel or spacer on the end portion of the flexible flat conductor prior to molding the connector body member about the end of the flat flexible conductor to provide a male termination for the flexible conductor.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings in which.

Figure 1:
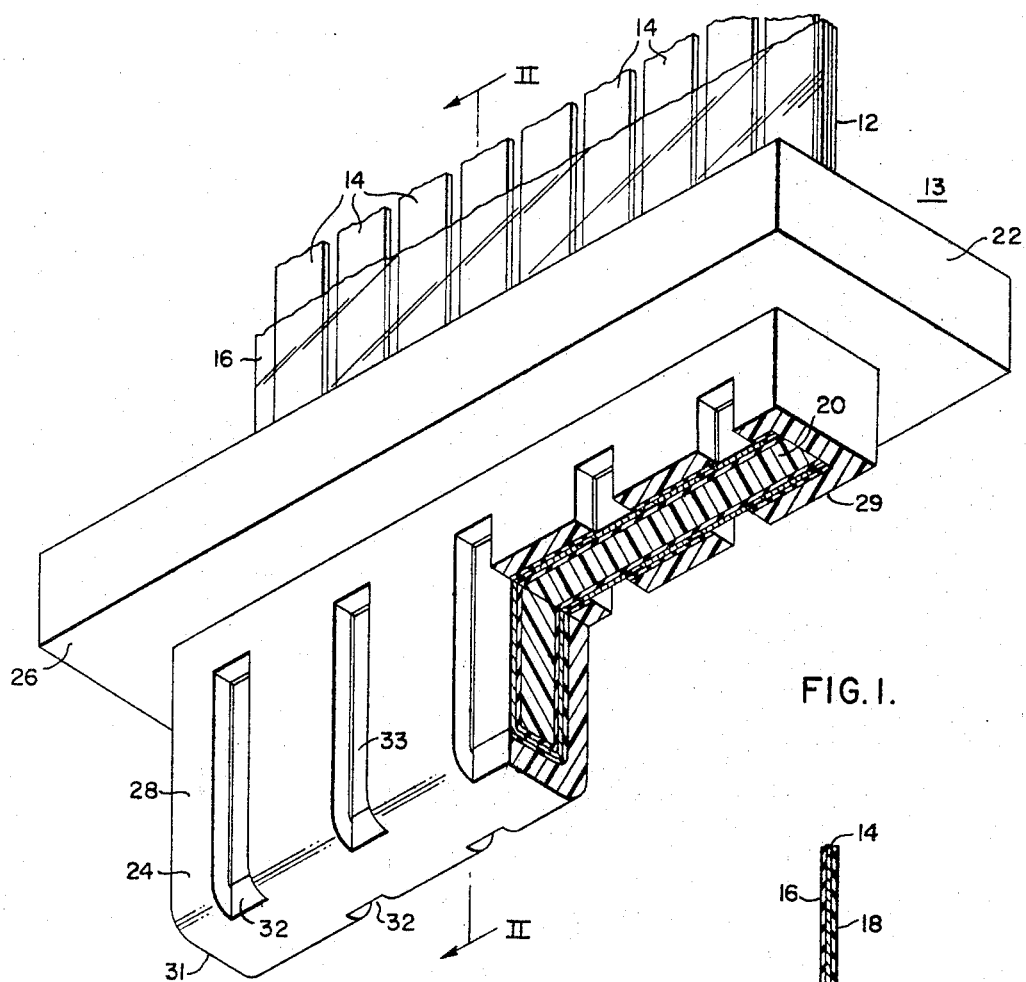
FIGURE 1 is a perspective view of a circuit assembly device partly in section in accordance with the teaching of my invention.
Figure 2:
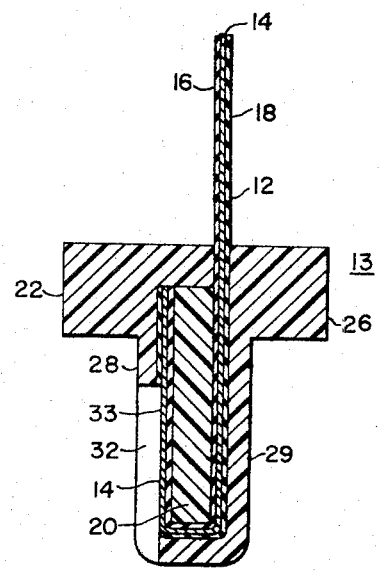
FIG. 2 is a sectional view taken along line II—II of FIG. 1.

Referring to FIGS. 1 and 2, there is illustrated a flexible cable connection termination member 13 for a cable 12. The flexible conductive cable 12 is comprised of a plurality of elongated electrically conductive elements 14 of a suitable material such as copper sandwiched between two electrically insulating layers 16 and 18 of suitable insulating materials. In the specific embodiment shown, there are nine electrical conductors 14 provided within the cable 12.

Figure 5:
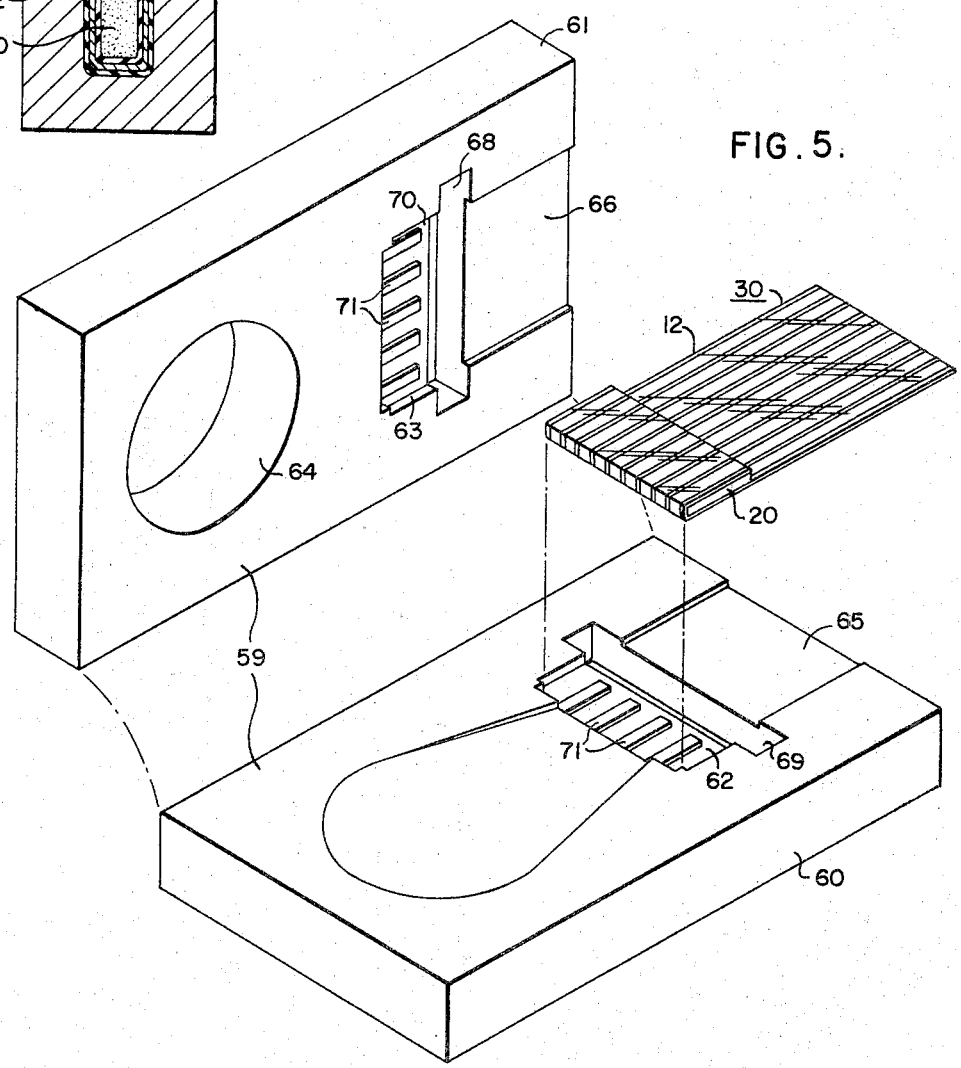
FIG. 5 is a perspective view in exploded form illustrating a second step in the molding and forming operation of the circuit assembly.

The end of the cable 12 is wrapped around a mandrel 20 to provide an insert 30 as illustrated in FIG. 5. The insert 30 is molded within a termination body 22. The termination body 22 provides a male termination member including an insert portion 24 and a base portion 26.

The insert portion 24 provides two substantially parallel molded layers 28 and 29 with a molded nose portion 31. Openings or windows 32 are provided in the layers 28 and 29 in alignment with selected conductors 14 in the flat flexible cable 12. In the specific embodiment shown in FIGS. 1 and 2, the upper layer 28 is provided with five openings 32 over five of the conductors 14 and the lower layer 29 is provided with four openings 32 over the other four conductors 14 in the cable. By providing alternating exposure of the conductors 14 on opposite sides as shown in FIGS. 1 and 2, one is able to easily provide contact areas for a closely pitched cable. If desired, an opening 32 could be provided to each conductor 14 through only one of the layers 28 or 29 or an opening 32 could be provided through both layers 28 and 29 to each conductor 14 to provide for multiplicity of contact.

The portion of the insulating layers 16 and 18 covering the conductors 14 under the opening or window 32 is removed and a suitable electrical contact area 33 is provided on the conductor 14. If desired, suitable metals may be coated on this contact area 33 to provide a better electrical contact in a well known manner.

Figure 3:
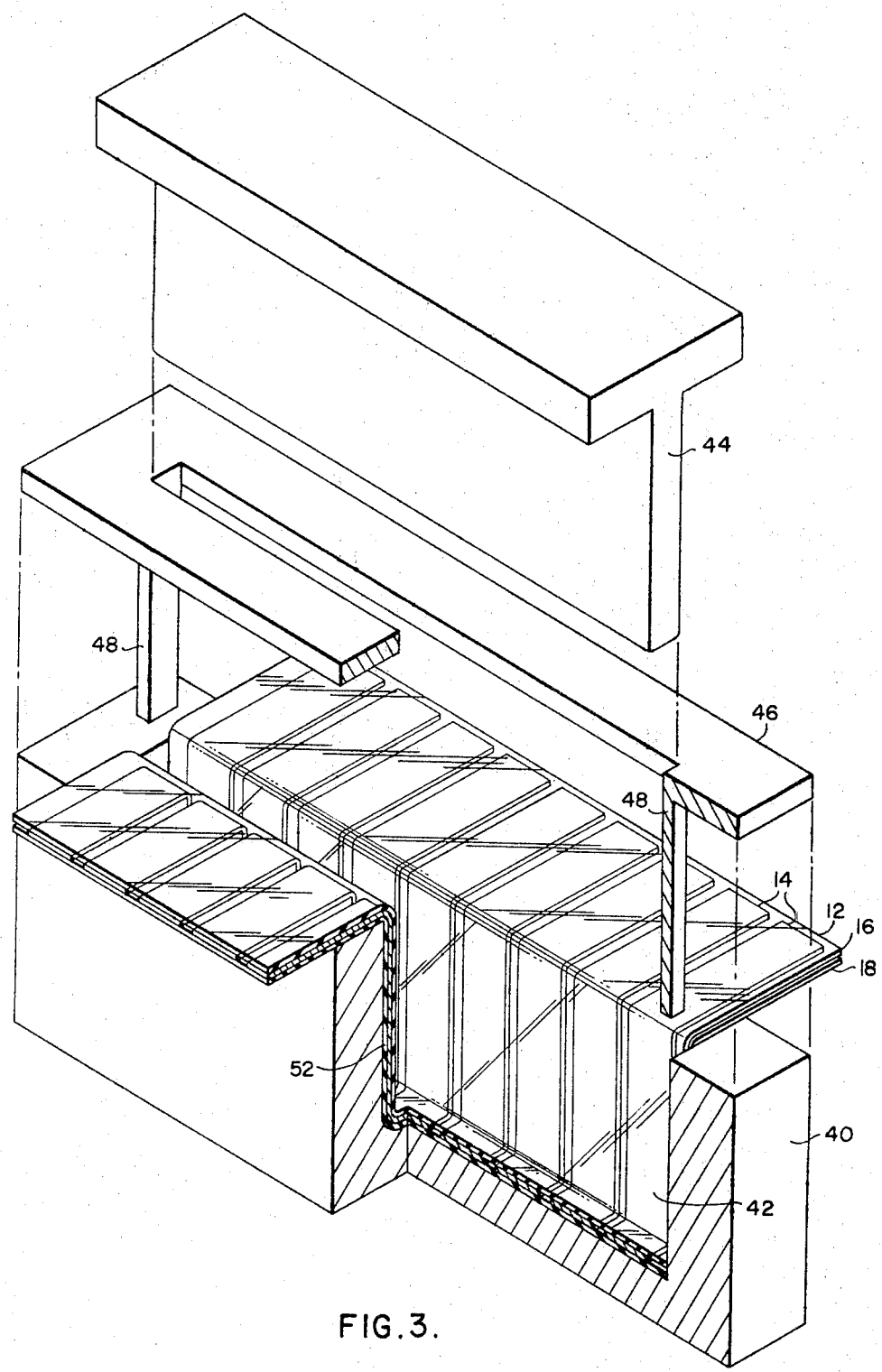
FIG. 3 is a perspective view, in exploded form illustrating the molding or forming step in the assembly operation embodying my invention.
Figure 4:
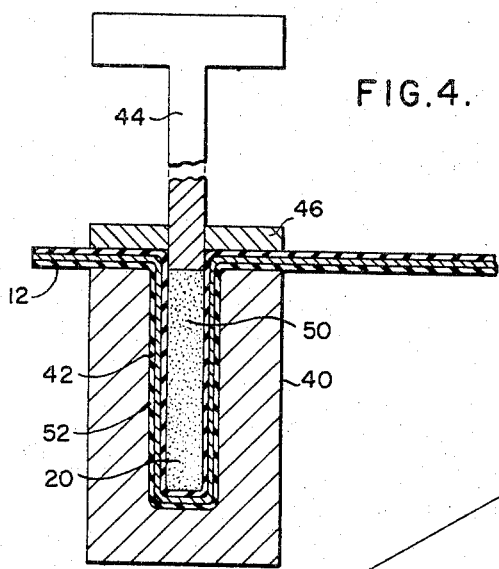
FIG. 4 is a sectional view also illustrating the molding or forming step in the assembly operation embodying my invention.

Referring now to FIGS. 3, 4 and 5, the fabrication of the electrical circuit termination 13 is described. The conductive cable 12 may be in many forms. In the specific embodiment shown, the cable 12 may be made by starting with a copper foil of about 2 to 4 mils in thickness and 1 to 3 inches in width. The foil is coated on one surface with a suitable insulating material to provide the layer 18. The layer may be an aromatic polyimide or aromatic polyamide-imide to provide a thickness of about 1.5 to 2.5 mils. A suitable resist such as wax, a low melting thermoplastic resin or carbon black pigmented short oil varnish is then provided on the copper foil on those areas where the conductive elements 14 are desired. The portions of the copper foil that are not protected by resist are then removed by suitable etchants such as an aqueous solution of ferric chloride to provide the nine parallel elements 14 about 100 mils in width on the layer 18. The resist is removed after etching with a suitable cleaner. This procedure provides the conductive elements 14 with one insulating layer 18. The layer 16 may be of a similar material as 18 and applied to cover the conductors 14 with a thickness of about 2 mils. A flexible epoxy adhesive may be used to secure the layer 16 to the conductors 14 and the layer 18.

The cable 12 may be constructed in many different ways and it is only necessary that at least one of the layers 16 or 18 be of a material that may be removed by suitable techniques. The layer 18 in the specific embodiment is preferably a film of aromatic polyimide or aromatic polyamide-imide resin and reference may be had to the copending application Ser. No. 352,163 filed Mar. 16, 1964, by Freeman et al. and assigned to the same assignee for details of flat flexible multiple conductor cables employing the foregoing resins as insulation. Methods of preparing the flat conductor cable are described in the heretofore noted Freeman et al. application and also in application Ser. No. 352,154 filed Mar. 16, 1964, also assigned to the same assignee of this invention. Reference may be had thereto for details of preparation. The preparation of aromatic polymeric imide resins is described in British Patent 903,271 and reference may be made thereto for specific details. The preparation of polymeric amide-imide resins is described in the copending application, Ser. No. 295,279, assigned to the assignee of this invention, and reference may be had thereto for further details.

Insulating films of aromatic polyimides and polyamide-imide resins can be removed by strong hot alkaline solutions. In the presence of a strong alkaline solution it is theorized that imide linkages in the polymer chain are hydrolized, resulting in the formation of the salts of the phthalmic acid formed by opening the imide ring. These salts are water soluble and can be easily removed by washing or rinsing with water. The behavior of these aromatic polyimides and polyamide-imides is advantageous in this invention in that they may be rapidly removed by chemical means. Reference may be had to the application Ser. No. 352,154 filed Mar. 16, 1964, assigned to the assignee of this invention for details on materials and techniques for removing aromatic polyimide and aromatic polyamide films. This application and those mentioned heretofore are to be considered as incorporated herein by reference. This invention is not limited to these specific materials or the specific techniques utilized therein but is applicable to all those insulating materials that may be removed by any means and all electrical conductive materials that will provide an effective contact.

Referring now to FIG. 3, the end of the cable 12 is inserted into a mold cavity 42 of a mold 40. This insertion is accomplished by means of positioning the cable 12 around a plunger 44 and a hold-down fixture 46. The hold-down fixture 46 is provided with two hold-down fingers 48 which also enter into the mold cavity 42. By this procedure, the cable 12 is inserted into the mold cavity as illustrated in FIG. 3. The hold-down fixture 46 with the fingers 48 extends into the mold 40 and holds the cable 12. The plunger 44 is then retracted and a suitable molding material 50 such as a thermosetting plastic in the form of a loose material is positioned within the mold cavity 42 as illustrated in FIG. 4. A suitable specific mold material is mineral filled epoxy. The plunger 44 is pressed down on the mold material 50 at about 150 pounds per inch and the mold is heated to a temperature of about 320° F. This is a simple compression molding technique and the material 50 is compressed within the fold 52 of the cable 12 to form the mandrel or spacer 20. The mandrel 20, formed in this manner, is secured to the insulating coating 16 and after removal from the mold is the insert 30 illustrated in FIG. 5.

The mold insert 30 is then inserted into a mold cavity 59 for forming the outer casing or body 22. The mold cavity 59 in FIG. 5 consists of a lower member 60 and an upper member 61. The facing surfaces of the lower mold member 60 and the upper facing member 61 include recessed portions 62 and 63 respectively. The recessed portions 62 and 63 form the mold cavity into which the mold insert is positioned. The mold material forming the outer casing 22 is forced through an opening 64 in the member 61 into the mold cavity by suitable transfer molding means. The mold material forming the member 22 is a mineral-filled epoxy molding compound. In the case of the epoxy compound, the material is heated to a temperature of about 325° F., placed under a pressure of about 250 pounds per square inch and forced through the opening 64 into the mold cavity. The material is allowed to set for about 3 minutes and the member is ejected from the mold. The recessed portion 62 includes a first portion 65 in which the cable 12 is seated. A corresponding recess 66 is provided in the recess 63. When the two faces 60 and 61 are clamped together with the cable 12 therein, the dimensions are such as to provide a substantial seal so that the mold material does not enter into the portion defined by the recessed portions 65 and 66.

The recessed portion 62 includes a second portion 67 and into which the mold material is forced to define the base portion 26 of the body 22. A corresponding recess 68 is provided in the recess 63.

The recessed portion 62 includes a third portion 69 forming a part of the mold cavity and into which the mold material is forced to define the insert portion 24 of the body 22. A corresponding recess portion 70 is included in the recess 63. Positioned within the recess portion 69 are four core pins or projecting portions 71 on which the mold insert 30 rests. Core pins 71 in recess 69 are positioned to be centered on the second, fourth, sixth and eighth conductors 14 from left to right. Similar core pins 71 five in number are located in the recess 70. The core pins 71 in the recess 70 are centered over the first, third, fifth, seventh and ninth conductors 14. The core pins 71 seat against the mold insert 30 when the members 60 and 61 are clamped together so that the mold material does not enter the area of the insert 30 against which the core pins 71 are seated. The core pins 71 form the openings 32 in the insert portion 24 of the body illustrated in FIGS. 1 and 2. In addition to using a simple loose thermosetting plastic material 50 for the mandrel 20, the mandrel could be made from a preform of long glass fibers such as a rope or cloth saturated with a B-staged molding resin such as epoxy. This type of construction will minimize flow and unequal pressures in the cavity which might cause fracture or ripping of the cable and also provide a very firm support for the contact surface. It is also not necessary to provide the fold 52 in the cable 12 as illustrated herein and one could utilize simply the end portion of the cable and mold a bar or pad of material to one surface of the cable 12.

Figure 6:
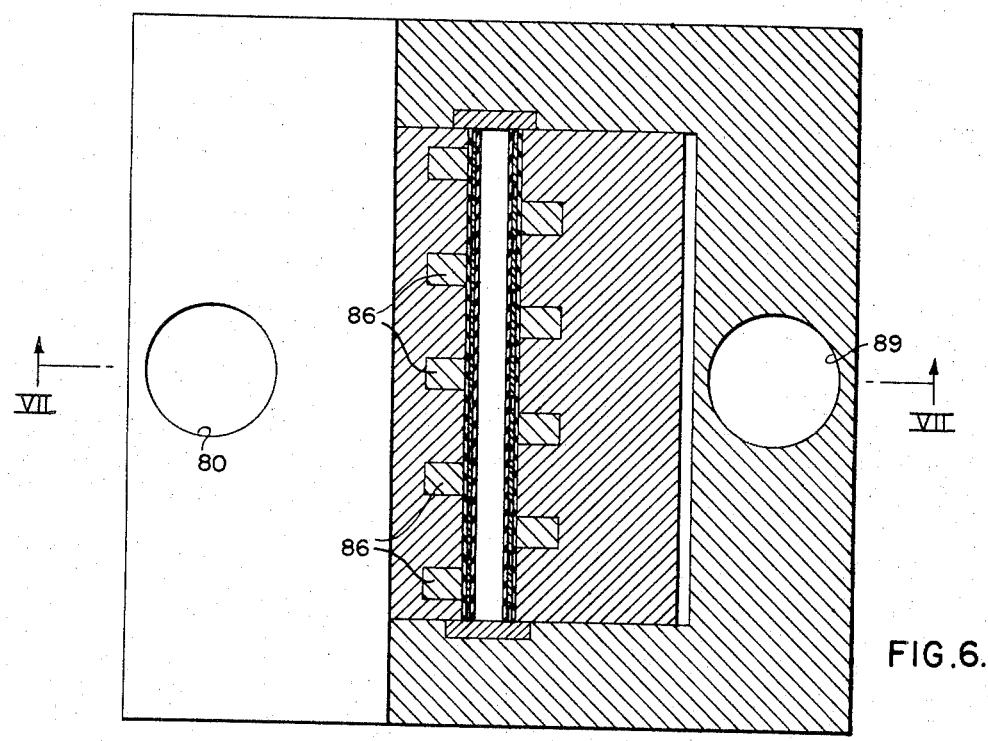
FIG. 6 is a sectional view of a mold illustrating the first step in a two-step molding operation.
Figure 7:
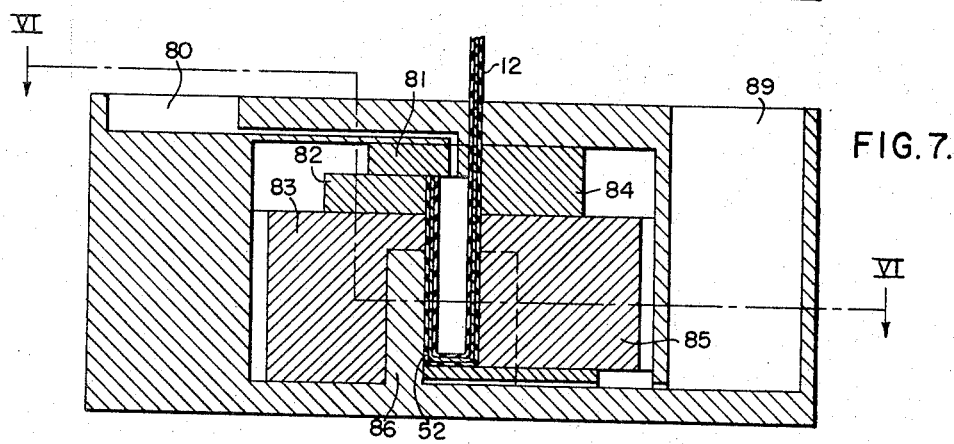
FIG. 7 is a sectional view of the mold in FIG. 6 illustrating the step in the two step molding operation.
Figure 8:
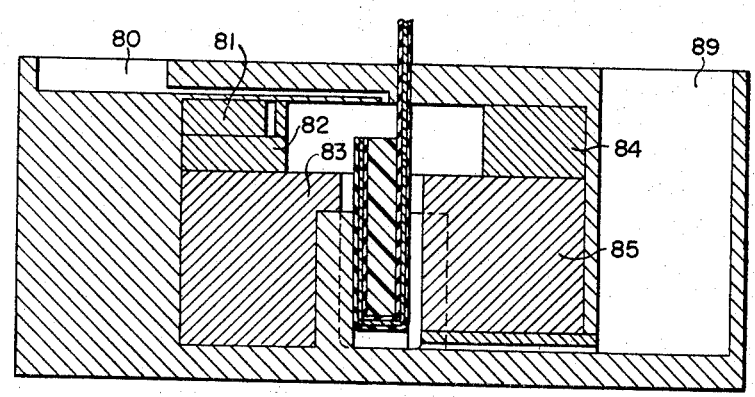

In the structure illustrated in FIGS. 3 and 4, a compression mold has been utilized but transfer molding can also be used. This would permit the use of molding compounds of soft flow variety so that excessive high molding pressure would not be encountered. In FIGS. 6, 7 and 8, a transfer mold is illustrated. The mold is designed to permit two separate mold cavities to be formed within the same transfer mold block with a common mold pot. In this manner, the mandrel 20 may be molded in one step and the body or casing 22 molded in a second step. This is accomplished in FIGS. 6, 7 and 8 with the provision of movable sections in the mold.

In FIGS. 6 and 7, the cavity is illustrated just prior to insertion of the mold material by transfer molding into the fold 52 provided in cable 12. The transfer mold material is inserted through an opening 80 and fills the fold 52. After this first step, core sections 81, 82, 83, 84 and 85 retract from the first position illustrated in FIG. 7 to the second position illustrated in FIG. 8. The core pins 86 remain in the fixed position against the cable 12. The mold material is again forced by transfer molding techniques through the opening 80 and also through an opening 89 so as to form the body portion 22. The procedure for removing the insulating coating 16 from the contact areas 33 and beneath the window 32 is fully discussed in the copending application 352,156 filed Mar. 16, 1964, and assigned to the same assignee as this invention. This is accomplished simply by submerging the insert portion 24 of the body 22 into a solution of a suitable chemical etchant such as a strong aqueous solution of sodium and/or potassium hydroxide. One specific embodiment, a 20 percent solution of sodium hydroxide at a temperature of 100° F. for a period of about 3 minutes was found adequate to remove the insulating layer 16. This etchant solution does not affect portions of the cable 12 covered by the casing 22. The contact areas 33 have to be cleaned after the insulation layer 16 is removed and plating of suitable materials may be provided thereon if desired.

While there have been shown and described what are at present considered to be the preferred embodiments of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

I claim as my invention:

1. The method of manufacturing an electrical circuit assembly comprising producing a flat flexible printed circuit cable having a plurality of coplanar electrically conductive members embedded therein, folding said printed circuit cable longitudinally back upon itself and inserting the bight of the fold into a mold cavity fixture by means of a rigid plunger and a guide therefor, removing said plunger and placing a thermosetting material within said fold, pressing said material by means of said guided plunger into said fold to cause said cable to conform to the shape of the mold cavity, heating said material in said mold to form a rigid spacer, inserting material around said fold and compressing and heating said material to form a termination device.

2. The method of manufacturing an electrical circuit assembly comprising providing a flat flexible circuit cable having a plurality of electrically conductive members embedded therein, inserting a portion of said cable into a mold cavity fixture by means of a rigid plunger and a guide therefor, removing said plunger and placing a thermosetting material in said mold in contact with one surface of said cable, pressing said material by means of said guided plunger into said mold to cause said cable to conform to the shape of said mold cavity, heating said material in said mold to form a rigid member in contact with said cable and inserting material around said cable and rigid member and compressing and heating said material to form a termination for said cable.

3. The method of manufacturing an electrical circuit assembly comprising producing a flat flexible cable having a plurality of electrically conductive members embedded in insulating material, folding said printed circuit cable longitudinaly back upon itself and inserting the bight of the fold into a mold cavity fixture by means of a rigid plunger and a guide therefor, removing said plunger and placing a thermosetting material within said fold, applying pressure to the thermosetting material by means of said plunger, and then curing said material to form a rigid spacer in said fold with the outer dimensions of said fold determined by the inner dimension of said mold cavity.

4. The method of manufacturing an electrical circuit assembly comprising providing a flat flexible printed circuit cable having a plurality of coplanar electrically conductive members embedded in an electrically insulating material inserting a portion of said cable into a mold cavity by means of a rigid plunger and a guide therefor, removing said plunger and placing a thermosetting material within said mold cavity, applying pressure by means of said plunger to press one surface of said cable to conform the cable to a portion of the surface of said mold cavity, curing said material in said mold to form a rigid contact to said cable.

5. The method of manufacturing an electrical circuit assembly comprising producing a flat flexible printed circuit cable having a plurality of coplanar electrically conductive members embedded in an insulating material, folding said printed circuit cable longitudinally back upon itself and inserting the bight of the fold into a mold cavity fixture by means of a rigid plunger and a guide therefor, removing said plunger and placing a thermosetting material within the fold, pressing said material into said fold by means of said plunger to cause the outer surface of said fold to conform to the shape of the mold cavity and curing said material in said mold cavity.

References Cited
UNITED STATES PATENTS

| | | | |
|---|---|---|---|
| 2,158,044 | 5/1939 | Haller | 264—266 X |
| 2,684,502 | 7/1954 | Paulve | 264—266 X |
| 3,069,753 | 12/1962 | Lalmond et al. | 339—275 |
| 3,258,831 | 7/1966 | Angele et al. | 264—272 X |

ROBERT F. WHITE, *Primary Examiner.*

J. H. SILBAUGH, *Assistant Examiner.*